United States Patent
Vogler-Ivashchanka et al.

(10) Patent No.: US 7,890,964 B2
(45) Date of Patent: Feb. 15, 2011

(54) METHODS AND APPARATUS FOR CONTEXTUAL AWARENESS IN A GROUPWARE CLIENT

(75) Inventors: Iryna Vogler-Ivashchanka, Los Altos, CA (US); Nir Kol, Sunnyvale, CA (US); Dennis Brian Moore, Hillsborough, CA (US); Narayan Nayar, Redwood City, CA (US); Eric Wood, Menlo Park, CA (US); Frederic E. Samson, Palo Alto, CA (US)

(73) Assignee: SAP AG, Walldorf (DE)

( * ) Notice: Subject to any disclaimer, the term of this patent is extended or adjusted under 35 U.S.C. 154(b) by 961 days.

(21) Appl. No.: 11/409,379

(22) Filed: Apr. 20, 2006

(65) Prior Publication Data

US 2006/0277166 A1 Dec. 7, 2006

Related U.S. Application Data

(60) Provisional application No. 60/673,795, filed on Apr. 22, 2005, provisional application No. 60/673,794, filed on Apr. 22, 2005.

(51) Int. Cl.
G06F 9/44 (2006.01)
G06F 15/16 (2006.01)
G06F 15/173 (2006.01)
G06F 9/46 (2006.01)

(52) U.S. Cl. .............. 719/330; 709/203; 709/217; 709/223; 718/108

(58) Field of Classification Search .............. 707/100, 707/3; 709/229; 705/8
See application file for complete search history.

(56) References Cited

U.S. PATENT DOCUMENTS

| | | | |
|---|---|---|---|
| 4,862,357 A | 8/1989 | Ahlstrom et al. | 364/407 |
| 5,021,953 A | 6/1991 | Webber et al. | 364/407 |
| 5,237,499 A | 8/1993 | Garback | 364/407 |
| 5,331,546 A | 7/1994 | Webber et al. | 364/407 |
| 5,404,488 A | 4/1995 | Kerrigan et al. | |
| 5,477,447 A | 12/1995 | Luciw et al. | |

(Continued)

FOREIGN PATENT DOCUMENTS

EP 1460538 1/2004

(Continued)

OTHER PUBLICATIONS

Microsoft: About Smart Tags, http://office.microsoft.com/en-us/assistance/HP030833041033.aspx printed Mar. 15, 2005.

(Continued)

*Primary Examiner*—H. S. Sough
*Assistant Examiner*—Tuan Dao
(74) *Attorney, Agent, or Firm*—Blakely, Sokoloff Taylor & Zafman

(57) ABSTRACT

Methods and apparatuses provide contextual awareness to a groupware client with respect to an enterprise backend system. The groupware client generates a query or request for data within a context of the groupware client. A backend determines the context, which may include processing an indication of the context received with the query. Data is selectively chosen based on the context, and the selected data is provided to the groupware client to fulfill the request. In one embodiment, the backend determines a permission associated with the context.

17 Claims, 5 Drawing Sheets

U.S. PATENT DOCUMENTS

| | | | |
|---|---|---|---|
| 5,749,079 A | 5/1998 | Yong et al. | |
| 5,754,782 A | 5/1998 | Masada | |
| 5,864,848 A | 1/1999 | Horvitz et al. | |
| 5,946,464 A | 8/1999 | Kito et al. | |
| 5,948,040 A | 9/1999 | DeLorme et al. | 701/201 |
| 6,009,408 A | 12/1999 | Buchanan | 705/11 |
| 6,026,410 A | 2/2000 | Allen et al. | |
| 6,085,201 A | 7/2000 | Tso | |
| 6,119,095 A | 9/2000 | Morita | 705/5 |
| 6,209,018 B1* | 3/2001 | Ben-Shachar et al. | 718/105 |
| 6,442,526 B1 | 8/2002 | Vance et al. | 705/5 |
| 6,622,147 B1 | 9/2003 | Smiga et al. | |
| 6,632,251 B1 | 10/2003 | Rutten et al. | 715/530 |
| 6,732,080 B1 | 5/2004 | Blants | 705/9 |
| 6,801,226 B1 | 10/2004 | Daughtrey | 345/763 |
| 7,050,986 B1 | 5/2006 | Vance et al. | |
| 7,080,021 B1 | 7/2006 | McCulloch | |
| 7,100,195 B1* | 8/2006 | Underwood | 726/2 |
| 7,167,919 B2* | 1/2007 | Iwamoto et al. | 709/229 |
| 7,305,381 B1* | 12/2007 | Poppink et al. | 707/3 |
| 7,310,646 B2 | 12/2007 | Rangadass et al. | |
| 7,343,302 B2* | 3/2008 | Aratow et al. | 705/1 |
| 2001/0034736 A1 | 10/2001 | Eylon et al. | |
| 2002/0077842 A1 | 6/2002 | Charisius et al. | |
| 2002/0152101 A1 | 10/2002 | Lawson et al. | |
| 2002/0184402 A1 | 12/2002 | Gangopadhyay | |
| 2003/0120526 A1 | 6/2003 | Altman et al. | |
| 2003/0135565 A1 | 7/2003 | Estrada | |
| 2003/0135659 A1 | 7/2003 | Bellotti et al. | |
| 2003/0167281 A1 | 9/2003 | Cohen et al. | |
| 2004/0044987 A1* | 3/2004 | Kompalli et al. | 717/100 |
| 2004/0083195 A1* | 4/2004 | McCord et al. | 706/47 |
| 2004/0122835 A1* | 6/2004 | McKibben et al. | 707/100 |
| 2004/0122853 A1 | 6/2004 | Moore | |
| 2004/0143723 A1 | 7/2004 | Acker et al. | |
| 2004/0148299 A1 | 7/2004 | Teegan et al. | |
| 2005/0010819 A1 | 1/2005 | Williams et al. | |
| 2005/0171963 A1 | 8/2005 | Barrett | |
| 2005/0209904 A1 | 9/2005 | Hayashi | |
| 2007/0094110 A1 | 4/2007 | McCrea | |

FOREIGN PATENT DOCUMENTS

| | | |
|---|---|---|
| WO | WO 2004/021185 A2 | 3/2004 |
| WO | WO 2004/021185 A3 | 3/2004 |

OTHER PUBLICATIONS

Andreshak: Tech Ed Frontline News for Office Information Bridge Framework, https://blogs.officezealot.com/joe/archive/2004/05/25.aspx printed Mar. 15, 2005.

Int'l application No. PCT/EP2006/003707 Int'l Preliminary Report on Patentability (chapter 1) dated Oct. 23, 2007; 8 pages.

Non-Final Office Action mailed Oct. 29, 2008 for U.S. Appl. No. 11/312,435.

EP Application No. 06 724 504.3-2221; EP communication dated Mar. 4, 2008.

Final Office Action mailed May 9, 2008 for pending U.S. Appl. No. 11/312,435.

Dan Woods, "Packaged Composite Applications: A Liberating Force for the User Interface", internet document, Oct. 2003, p. 1-4, XP-002349437.

Anonymous, "Business Add-Ins", Internet document, Jul. 24, 2002, p. 1-15, XP-002296620.

John Clarkson, "Creating Add-Ins in Microsoft Excel 97", internet document, Apr. 1999, p. 1-3, XP-002296622.

Anind K. Dey et al., "CyberDesk: A Framework for Providing Self-Integrating Context-Aware Services", 1998 International Conference on Intelligent User Interfaces, New York, New York, Jan. 6, 1998, p. 47-54, XP-002155976.

International Search Report and Written Opinion, PCT Application No. PCT/EP2006/001110, filed Feb. 8, 2006, mailed Apr. 6, 2006, 11 pages.

Kum-Yew Lai et al., "Object Lens: A 'Spreadsheet' for Cooperative Work", ACM Transactions on Office Information Systems, vol. 6, No. 4, Oct. 1988, pp. 332-353, XP-002333144.

"Seven Tasks to Get Started With Microsoft Exchange", Windows IT Pro, InstantDoc #2702, Sep. 1996, www.windowsitpro.com, 19 pages, XP-002333125.

International Application No. PCT/EP2006/001110 Int'l Preliminary Report on Patentability dated Aug. 23, 2007.

International Search Report and Written Opinion, PCT Application No. PCT/EP2006/003706, filed Apr. 21, 2006, mailed Aug. 22, 2006, 11 pages.

International Search Report and Written Opinion, PCT Application No. PCT/EP2006/003708, filed Apr. 21, 2006, mailed Aug. 22, 2006, 12 pages.

Non-Final Office Action for U.S. Appl. No. 11/350,294, Mailed Sep. 16, 2009, 36 pages.

*Final Office Action* mailed Nov. 19, 2009 for U.S. Appl. No. 11/408,845, 13 pages.

Final Office Action for U.S. Appl. No. 11/350,294, Mailed Mar. 4, 2010, 21 Pages.

Non-Final Office Action for U.S. Appl. No. 11/408,844, Mailed Apr. 1, 2010, 47 Pages.

Non-Final Office Action for U.S. Appl. No. 11/408,844 Mailed Apr. 1, 2010, 47 Pages.

Non-Final Office Action for U.S. Appl. No. 11/409,378, Mailed May 24, 2010, 27 Pages.

Non-Final Office Action for U.S. Appl. No. 11/408,845, Mailed Jun. 24, 2010, 9 Pages

* cited by examiner

METHODS AND APPARATUS FOR CONTEXTUAL AWARENESS IN A GROUPWARE CLIENT

RELATED APPLICATIONS

The present application claims the benefit of priority under 35 U.S.C. §119(e) to U.S. Provisional Application No. 60/673,795, filed Apr. 22, 2005, and to U.S. Provisional Application No. 60/673,794, filed Apr. 22, 2005.

FIELD

Embodiments of the invention relate to enterprise data access, and more particularly to providing data dynamically to a groupware client based on context.

BACKGROUND

In enterprise systems, workflows are often used by participants of a workflow in performing work. A workflow generally refers to a flow of tasks associated with a business process. Enterprises increasingly rely on computers for performing tasks related to a business process, and thus, for executing the tasks of a workflow. Computers can provide mechanisms for modeling, executing, and/or controlling workflows, typically through a graphical user interface (GUI). A GUI may be related to a particular program or application that acts as an interface for operating on a workflow.

Traditional interfaces to workflows involve multiple, unrelated desktop applications. Thus, a participant in a workflow may receive a notification of one or more tasks via an email application or other collaborative software, and then need to launch a Web browser or other application to access an enterprise system that will enable the participant to complete the task(s). Besides using separate, unrelated applications for accessing work items, traditional groupware applications have fixed content options, which provides a fixed type of access to data regardless of the user or the work involved.

SUMMARY

Methods and apparatuses provide contextual awareness to a groupware client with respect to an enterprise backend system. The groupware client generates a query or request for data within a context of the groupware client. A backend determines the context, which may include processing an indication of the context received with the query. Data is selectively chosen based on the context, and the selected data is provided to the groupware client to fulfill the request. In one embodiment, the backend determines a permission associated with the context.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Figure 1:
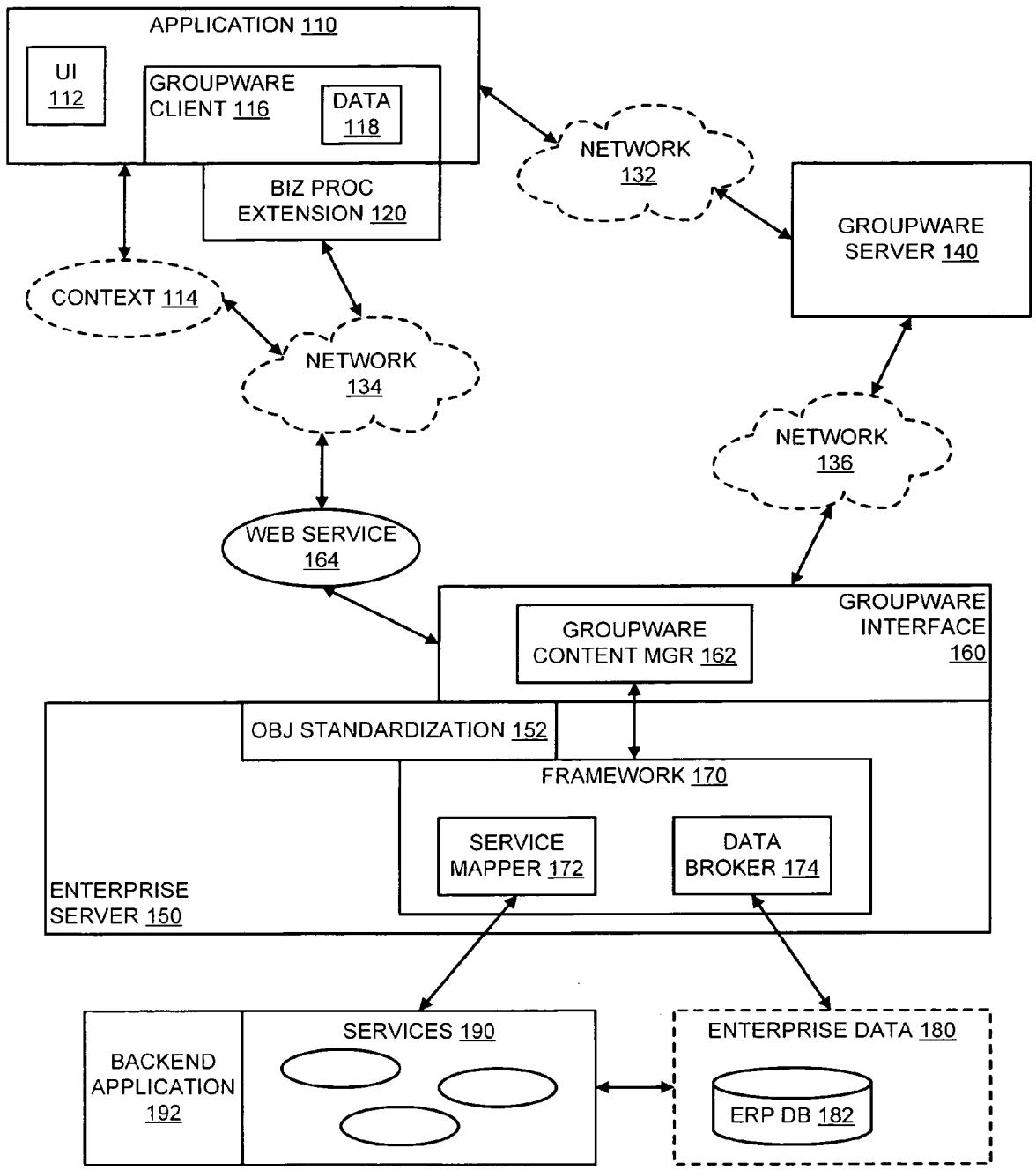
FIG. 1 is a block diagram of an embodiment of a groupware content manager to provide content to a groupware client with a business process extension.

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

Extensions to a groupware client enable access to a business process via the groupware client. The content of provided via the groupware client is contextual, and may change based on a user identifier (ID), a workflow ID, or other context. As used herein, groupware refers to any of a type of collaborative software, for example, email software, spreadsheet software, etc. Groupware is generally associated with a server that provides data and/or functionality to the software. A client refers to a program, routine, etc., that allows interaction with the groupware server. In one embodiment, a client refers to an application with a user interface that includes native functionality to access the groupware server. In an alternate embodiment, a client may operate/exist/execute independently of an application that has a user interface, and may in fact provide groupware server access functionality to multiple applications. Thus, a groupware client as referred to herein may refer to a groupware application, or to a program that enables one or more applications to access a groupware server. With extensions as described herein, a workflow participant can access and interact with a business process through a groupware client. In one embodiment, the groupware client is generated as a modeled software program.

As used herein, a business process refers broadly to a process used to perform work within an enterprise. One or more workflows may be associated with the business process through which to accomplish the work. A workflow includes one or more phases or stages, where each phase is an action or activity to be executed/performed in furthering progress towards the end-goal of the business process. For example, a "hiring" business process may include a "finding candidates" workflow, an "interviewing" workflow, etc., each of which may have multiple actions or activities associated (e.g., scheduling an interview time, arranging travel for the candidate, etc.), which may be executed to accomplish the end goal of hiring an individual. Each phase of a workflow is referred to herein as a "task," which may be a single item of work (an "action"), or a set of actions (an "activity"). A workflow may include structured and/or ad hoc tasks of a business process.

A workflow may include context in terms of organizational roles of participants, as well as documents, forms, or other data.

The extensions provided to the groupware client can enable integration of business process tasks into the environment of the groupware client (or an application with which the groupware client is associated). Additionally, the extensions can interact with other contextually aware modeled software in the groupware client (e.g., applications accessible from within or that otherwise operate with the groupware client—for example, via popup window, or available from pull-down menus). Changing content based on the context or environment of the groupware client may be referred to as contextual awareness, or a client being contextually aware. Contextual awareness in a groupware client refers to the dynamic providing of data and/or tools within the groupware client based on the context. Context refers to any number of environmental factors that can affect the permissions associated with a groupware client's access to enterprise data. Factors may include a user ID including a group or department association, a business role, a workflow being executed, a phase or action of a workflow being executed, whether a user is online or offline, a type of device from which the data is being accessed, etc. The context of a groupware client refers to the local environment of the groupware client, and may or may not include external factors in addition to the local factors.

In response to differing contexts, data may be selectively displayed, certain data objects may be provided or excluded from the groupware client from the backend systems, certain tools available from within the groupware client may be available or unavailable, etc. Tools refer to one or more items that provide functionality to access, modify, or otherwise operate on data. Data that can be accessed and selectively provided via the groupware client includes data objects, forms, functions, services, data structures, and/or processes. A backend system includes logic and services to manage and control the data and processes, and may be referred to as a business backend system. The backend systems include applications that execute to provide one or more particular functions or services.

The user interface of a groupware application is likely to be familiar to the workflow participant, and may allow the integration of tools of the groupware application (e.g., spellchecking, translations, etc.) into the performance of the workflow task. The groupware application typically includes various fields in which to present information and/or work for the user. Rather than providing multiple, different applications each with a different environment in which to perform work, integration of enterprise data and contextual information within the groupware client can enable providing multiple items within the format and with the tools of the groupware application. For example, a particular groupware application may include a folder list to provide access to data or work items. Integration of enterprise data into the groupware application with contextual awareness enables the groupware application to include a folder having access to the enterprise data, rather than simply data local to the groupware client or available from the groupware server. The integration with contextual awareness enables connecting the user to the backend enterprise systems within the groupware application, which means a user does not have to change from the context of the groupware application to access enterprise data and work items. The availability of the contextually aware data from within the groupware application is in contrast to traditional systems that required the user to switch from one application to another to perform work. Thus, a workflow participant (i.e., a user, or entity that participates in a workflow) can interact (e.g., create, process, track, set preferences, etc.) with a workflow through the familiar user interface of the groupware client or associated application with contextually dynamic data.

In contrast to the integrated use of groupware with a workflow as described herein, current email notifications or other traditional functions of groupware focus only on a single task or action with respect to the workflow. With the integration of groupware functionality and enterprise access, the business process information associated with a workflow presented in the groupware application is persisted with the integrated groupware client. For purposes of simplicity in description, use of the term "groupware client" may refer to the groupware client and/or its associated groupware application(s). Persisting the information refers to making the information available to the workflow participant either continuously, or upon request, and from within the context of the groupware client. For example, status information may be provided to the groupware client to provide updated information for the business process within the groupware client. Also, or in the alternative, status information could be accessible, for example, when the workflow participant selects an item/icon or executes an action within the groupware client. Persisting the information may include storing the information locally to the groupware client, or within a storage location within a groupware server, in addition to storing the information within the enterprise backend. The data that is persisted, and the work provided in the workflows is dynamic and provided based at least in part on what is happening within the groupware client, in terms of who is accessing what, and when.

FIG. 1 is a block diagram of an embodiment of a groupware content manager to provide content to a groupware client with a business process extension. Application 110 represents any software program or other application that includes groupware client 116, or accesses groupware client 116. Groupware client 116 provides interaction with groupware server 140, which provides groupware information and/or services for groupware application 110. Groupware server 140 may be, for example, an email server (e.g., an EXCHANGE server available from MICROSOFT CORPORATION of Redmond, Wash.). In addition to traditional operation by groupware server 140, groupware server 140 can include extensions to enable groupware client 116 to access enterprise services and/or data for application 110. Application 110 and groupware server 140 can be connected directly, or over network 132.

In one embodiment, groupware server 140 is coupled over network 136 to groupware interface 160 of enterprise server 150. Networks 132, 136, and also 134, described below, may include one or more local area networks (LANs), including wireless or wired networks, and hardware and software with which to operate on the network. Network 132-136 may also include other networks, for example, wide area networks, enterprise networks, virtual private networks (VPNs), etc. In one embodiment, groupware server 140 exists within the same local network as groupware interface 160 and/or enterprise server 150, although existence within the same local network is not a requirement. Enterprise server 150 represents both hardware and software that operates to provide enterprise data and services access and/or management.

Groupware interface 160 represents hardware and/or software to provide groupware-enterprise integration/management. In one embodiment, part or all of groupware interface 160 is incorporated within groupware server 140. In another embodiment, part or all of groupware interface 160 is incorporated within enterprise server 150. In another embodiment, part or all of groupware interface 160 is a standalone entity in hardware and/or software. In one embodiment, groupware interface 160 includes one or more components based on Enterprise Services Architecture (ESA) available in conjunction with mySAP and NETWEAVER products available from SAP AG of Walldorf, Germany, and/or one or more components based on MICROSOFT .NET. In one embodiment, groupware interface 160 is a server or manager product (e.g., a MENDOCINO server available from collaborative efforts of MICROSOFT CORPORATION and SAP AG). Thus, groupware interface 160 may also be referred to as an interface server, or an enterprise-groupware manager.

Groupware interface 160 provides one or more mechanisms to enable interaction between groupware client 116 and enterprise server 150, either directly or via groupware server 140. The interaction may include requests between groupware client 116 and enterprise server 150, and responses to the requests. From the groupware side, groupware client 116 may make requests and/or send actions or commands generated from within application 110 to perform a function with respect to enterprise data related to a workflow that exists within the context of application 110. Enterprise server 150 may provide reports, errors, status or other information, data objects, service access, etc., to application 110 through groupware interface 160.

In one embodiment, groupware interface 160 includes groupware content manager 162, which represents one or more modules or agents that provide contextual awareness to data 118 presented to groupware client 116, which is in turn provided to a user through user interface (UI) 112.

In one embodiment, groupware interface 160 "holds" information related to dynamic data 118 currently accessed within application 110 when application 110 is offline, or disconnected/unable to access groupware server 140 and/or groupware interface 160 or enterprise server 150. When access is restored and application 110 comes back online, information may be synchronized with information local to application 110 related to the data 118. Synchronization of information may also occur when application 110 is online, such as through event-driven connectivity originating from application 110, and/or through a pull daemon that synchronously and/or asynchronously initiates access of enterprise server 150 from application 110. Groupware interface 160 may include a repository or storage wherein information can be locally held or temporarily contained until a synchronization opportunity (e.g., an event, an action, at a time, etc.).

Groupware content manager 162 obtains information and status updates, from which dynamic data 118 is provided, through interaction with enterprise data 180 or with one or more services 190 via framework 170. Framework 170 provides a framework of logic and services that enable groupware interface 160 to provide enterprise-level information to groupware server 140. In one embodiment, groupware interface 160 and framework 170 are part of the same software and/or hardware module. In one embodiment, groupware interface 160 could be considered a "groupware server" layer of a groupware-enterprise manager/server, and framework 170 could be considered an "enterprise" layer of the groupware-enterprise manager/server.

Enterprise server 150 includes framework 170, which represents structured logic with which to provide status information to groupware server 140, and optionally receive requests or queries from groupware server 140. Similar interaction can be provided directly to application 110 through the use of Web service 164. In one embodiment, framework 170 includes a composite application framework (e.g., SAP CAF) and/or a services architecture (e.g., SAP ESA (ENTERPRISE SERVICES ARCHITECTURE)). Framework 170 may include service mapper 172, which represents logic to map requests or queries to an appropriate enterprise service. Data broker 174 represents logic to access enterprise data 180, including, for example, enterprise resource planning (ERP) database (DB) 182. Other data may be available in enterprise data 180. In one embodiment, framework 170 models backend logic to provide appropriate data and service access to groupware server 140/groupware client 116. In one embodiment, a composite application framework provides backend logic to a front-end (e.g., an application). As shown, groupware server 140 may interface enterprise server 150 through extensions in much the same way a composite application can interface the enterprise backend.

Services 190 broadly represent functions that can be performed on enterprise data or with respect to enterprise data. For example, services 190 may include one or more enterprise services, which represent functions that can be performed with respect to a local enterprise. A local enterprise refers to an enterprise to which the workflow belongs. A local enterprise may include one or more domains, domain servers, local area networks (LANs) whether wired or wireless, virtual LANs (VLANs), etc. An enterprise is local with respect to a server that generally provides access to a device of a user (specifically shown is enterprise server 150).

A local enterprise may be in contrast to a remote enterprise, which represents an enterprise that is not local. One or more elements of information or data objects, or one or more functions or services related to a workflow, or operable on a workflow, may exist within an enterprise remote to enterprise server 150 (i.e., managed separately). In one embodiment, one or more remote enterprise services can provide contextual data to groupware client 116. One example of access to a remote enterprise service includes access within a cooperative relationship between enterprises, e.g., with a grid trading network. A grid trading network generally enables users to access enterprise data and share functionality across separate enterprises.

Services 190 may also include one or more Web services, which represent one or more services that provide access to one or more particular websites, or to the Internet in general. Service mapper 174 may determine which of services 190 can/should be invoked to fulfill a request/action received from groupware client 112. In one embodiment, service mapper 174 may determine that multiple services 190 are appropriate services with which fulfill a request. Thus, multiple of services 190 may be selected simultaneously, or substantially simultaneously (e.g., temporally proximate in time, selected by a single operation or routine, selected to execute in parallel, etc.) to provide functionality. Note that the use of multiple of services 190 may signify the use of multiple enterprise services 192 and/or the use of disparate services (e.g., an enterprise service 192 and a remote enterprise service 194, or any combination).

Backend application 192 represents one example of an application that executes in a backend system, from which particular data and/or functions may be available to groupware client 116. Contextual awareness can include providing access to certain services to application 110, while other services are not available. Thus, backend application 192 can be available through a service available to groupware client 116 based on the context of application 110. If the context allows access to backend application 192, groupware content manager 162 enables groupware client 116 access to the appropriate service. If the context does not allow access, the service may be inaccessible within the application, at least until such time as the context may allow access to backend application 192.

In one embodiment, in addition to access to enterprise server 150 through groupware server 140, or as an alternative to the access through groupware server 140, groupware client 116 and/or application 110 may include business (biz) process extension 120. Business process extension 120 may be similar to the extensions that could be provided to groupware server 140, although they could be different. Business process extension 120 may include a repository of information and/or a metadata processing engine to be able to provide status information and persistence of business process information to groupware client 116. If application 110 were to be executed offline, the repository or storage may store information that can later be passed to enterprise server 150 and/or synchronized with the enterprise. Business process extension 120 may provide logic with which groupware client 116 interfaces with groupware server 140, and/or processes information exchanged with groupware server 140. In one embodiment, business process extension 120 provides groupware client 116 with an interface to enterprise 150 through Web service 164, which represents one or more Web services with which to access enterprise server 150. Web service 164 represents one or more services accessible to application 110/groupware client 116. Access to a Web service is typically authorization-based, and may include registering. The context of application 110 can determine whether Web service 164 can provide access functionality to enterprise server 150 and/or groupware interface 160. Web service 164 refers to a function or routine through which the access can be accomplished.

In one embodiment, enterprise server 150 includes object standardization 152, which represents one or more software and/or hardware modules. With the integration of enterprise data access in application 110, application 110 may potentially have access to any of multiple different types of data objects. Object standardization 152 can provide a common interface for objects sent to application 110. Object standardization 152 can provide a common formatting or "look and feel" of objects to enhance the seamless nature of the enterprise access integration. In one embodiment, object standardization 152 includes a translator between the enterprise backend formatting and the context of application 110. Thus, an object may be accessed and presented in application 110 in a way that the object takes on the look and feel of application 110. Text may be formatted, icons may be matched, etc. Additionally, reports, alerts, functions, etc., received from the enterprise can be presented in the application with the same feel of similar items that occur locally within application 110. In one embodiment, object standardization 152 provides the functionality to provide contextual data within the context of application 110. Thus, if certain data and/or tools are or are not available within a particular context, the data and/or tools can be selectively accessed and provided, as appropriate.

The context or a work environment of application 110 is indicated by context 114. Context 114 could include anything through which contextual information may be derived (e.g., user name and password, preferences, documents, software version/status information, authorizations, keys, or any other information that may indicate a preference or authorization for access to data). Context 114 may be passed to enterprise server 150 and/or to groupware interface 160 through any interaction mechanism between groupware client 116 and groupware interface 160. Thus, enterprise server 150 can react to the context of application 110 when providing information. Filters may be employed to limit data passed or services available that are appropriate for an authorization indicated by context 114. In one embodiment, filters may be provided to provide data/services that match preferences, or are associated with a particular work context or application being used. Thus, the adaptability and power of enterprise server 150 can be available to a workflow participant through a groupware application.

Figure 2:
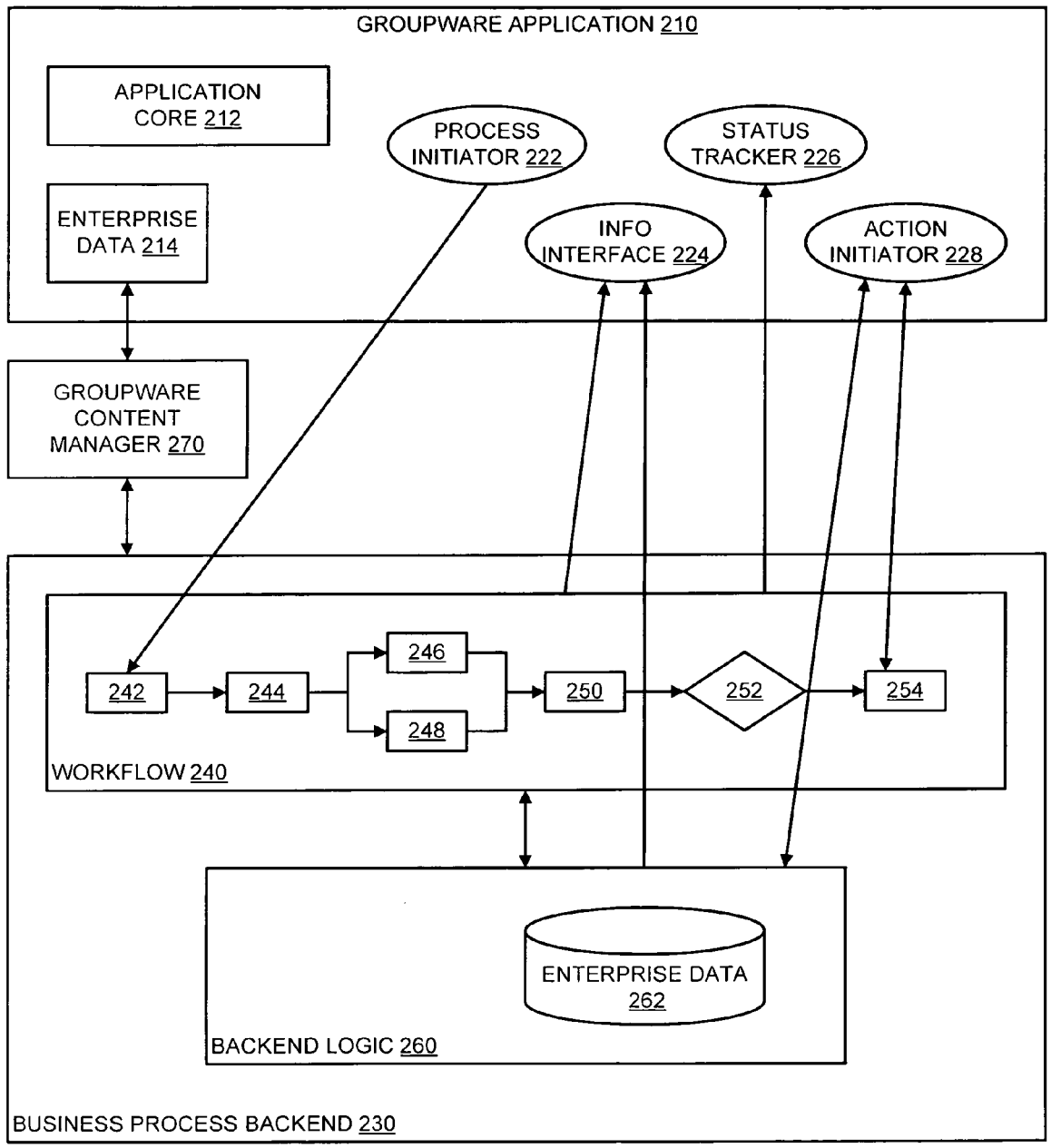
FIG. 2 is a block diagram of an embodiment of a groupware application with enterprise data provided by a groupware content manager.

FIG. 2 is a block diagram of an embodiment of a groupware application with enterprise data provided by a groupware content manager. Groupware application 210 represents a groupware application and/or associated groupware client according to any embodiment described herein. Application 210 includes application core 212, which represents code and logic that provides the general functions of application 210. Business process extensions are provided for application 210, and application core 212 represents the application without the extensions. The extensions provide the ability to interact with business processes from within application 210. As described herein, the interaction can be further subject to awareness of the context of application 210, which can provide dynamic presentation of data/tools in groupware application 210.

Groupware content manager 270 provides for contextual awareness for data/tool availability within groupware application 210. Enterprise data 214 represents data and/or tools of groupware application 210, which are managed by groupware content manager 270. In one embodiment, groupware manager 270 represents a composite of various mechanisms within extensions 222-228 to dynamically affect how workflows and/or other objects can be accessed/worked on within groupware application 210.

Groupware application 210 includes, or has access to one or more extensions, which may include process initiator 222, information interface 224, status tracker 226, and action initiator 228, each of which may be implemented as one or more modules. Additional or alternative extensions can be provided to result in an application that includes some, all, or different modules than what is shown in FIG. 2. Each of the modules may provide structured logic to implement one or more functions related to accessing or otherwise interacting with a workflow associated with a business process.

Process initiator 222 provides logic to initiate a workflow from within the context of application 210. Thus, a workflow participant can generate a new workflow from within the context of application 210. Rather than simply initiating a request for a new workflow, one or more actions from within application 210 can actually interface with business process backend 230 to generate the new workflow. As depicted, process initiator 222 may initiate workflow 240, and begin phase 242. Note that application 210 is not limited to interacting with workflows generated from within the context of application 210. Workflow 240 includes phases 242-254, which may represent any number of discrete parts of workflow 240. The phases may be conditioned on certain events or conditions, may be performed in parallel, etc. Process initiator 222 can limit the ability to generate a workflow based on the context of groupware application 210.

Information interface 224 can provide an interface to gather data and status or other information related to a workflow accessed within application 210. Information interface 224 may gather information from workflow 240 and/or from backend logic 260. Information interface 224 may be or include a repository of information that is obtained from business process backend 230, which may be included within an enterprise server. Backend logic 260 represents any service or data, which includes enterprise data 262, which can be accessible to application 210 through business process integration as described herein. Enterprise data 262 represents an enterprise repository that can include data objects, services, processes, process templates, etc. Backend logic 260 is to be understood as any data or function related to data that can be provided at the enterprise level through an enterprise server. Information interface 224 can selectively obtain information/objects based on the context of groupware application 210. In one embodiment, a mechanism in the backend (e.g., an implementation where groupware content manager 270 is a module in business process backend 230) selects information to provide to information interface 224. In another embodiment, information interface 224 enforces restrictions on information access relative to the context of groupware application 210.

Status tracker 226 provides a mechanism that can monitor one or more workflows. Status tracker 226 may include a routine or other logic that can receive input regarding workflow 240 and update information in application 210 related to workflow 240. For example, status tracker 226 may store information in a status information repository or datastructure or other mechanism through which business information is persisted within application 210. Status tracker 226 may provide logic through which an icon or text displayed in a GUI associated with application 210 is modified. Status tracker 226 receives information related to workflow 240. In one embodiment, as the status of an object changes, different permissions may apply, which may cause groupware content manager 270 to alter availability to data/tools within groupware application 210.

Action initiator 228 can send or receive an action, or request for an action. On the sending side, action initiator 228 can send an action to any phase within workflow 240, for example, to perform a task associated with the phase. Action initiator 228 can likewise send an action to backend logic 260 to cause or result in action on workflow 240 from within the enterprise-level, rather than from within application 210. Thus, action may be directly or indirectly taken on workflow 240 from an action performed within application 210. Action initiator 228 may include functions associated with buttons or icons available from within application 210. Thus, for example, clicking or double-clicking a particular icon may make a change to workflow 240, or a change to a view provided on workflow 240 (e.g., change from a list view to a table view, etc.), or launch a guided process related to workflow 240. Action initiator 228 can provide certain action requests, and/or ignore certain action requests based on the context of groupware application 210.

On the receiving side, action initiator may receive updated information or a trigger from external to application 210 that can cause a function to occur within application 210. In one embodiment, such a received action can cause a function of application core 212 to be performed.

Business process extension 120, object standardization 154, and groupware interface 160 of FIG. 1, and process initiator 222, information interface 224, status tracker 226, and action initiator 228, and the groupware content managers can be implemented as modules, which may include hardware, software, and/or a combination of these. Software included within modules can instruct a machine to implement techniques described herein. Additionally, software can be used to describe how to manufacture a device to perform the functions of these components. Such software may be provided via an article of manufacture by a machine/electronic device/hardware.

An article of manufacture may include a machine accessible/readable medium having content to provide instructions, data, etc. The content may result in an electronic device or computing system performing various operations or executions described. A machine accessible medium includes any mechanism that provides (i.e., stores and/or transmits) information/content/instructions in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.). The machine accessible medium may further include an electronic device having code loaded on a storage that may be executed when the electronic device is in operation. Thus, delivering an electronic device with such code may be understood as providing the article of manufacture with such content described above. Furthermore, storing code on a database or other memory location and offering the code for download (i.e., providing the code for access) over a communication medium may be understood as providing an article of manufacture with such content described above.

Figure 3:
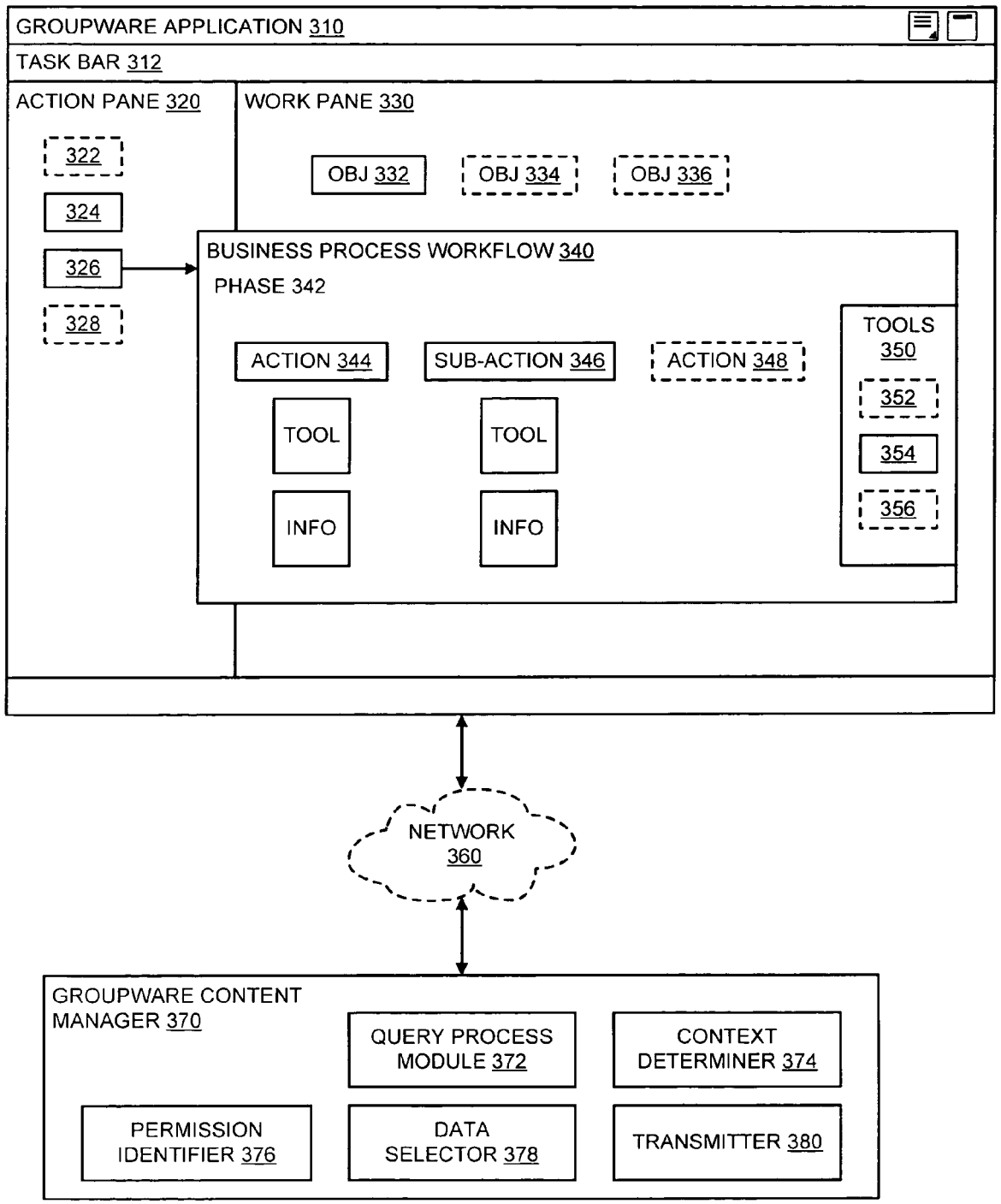
FIG. 3 is a block diagram of an embodiment of a groupware application with a business process workflow extension with enterprise data provided by a groupware content manager.

FIG. 3 is a block diagram of an embodiment of a groupware application with a business process workflow extension with enterprise data provided by a groupware content manager. Groupware application 310 is one example of a groupware client and/or application according to any embodiment described herein. Groupware application 310 may be an application such as would be found in an office productivity software suite (e.g., EXCEL or OUTLOOK in MICROSOFT OFFICE available from MICROSOFT CORPORATION). Groupware application 310 includes task bar 312, which can provide application 310 with various icons and menus to provide functionality to a user of the application.

In one embodiment, application 310 includes action pane 320, which can provide additional functionality to a user. Action pane 320 can also be referred to as a task pane. Action pane 320 may provide navigational advantages over task bar 312, in addition to having different functionality. Action pane 320 includes functionality tools 322-326, which may be links, icons, folders, tabs, etc., to provide one or more navigational functions and/or functions for performing work (e.g., completing tasks), and/or provide access to data or tools to perform work. In one embodiment, action pane 320 includes tab 324, which provides dynamic access to a business process workflow within the context of application 310. Application 310 includes several items that are shown in dashed lines. The items in dashed lines represent the fact that one or more objects may be visible and/or accessible based in whole or in part on the context of application 310. Thus, in one embodiment, items 322 and 328 may be accessible in only certain contexts.

For example, suppose item 322 is a folder that indicates a particular project, and accessing folder 322 provides access to various objects and/or workflows related to the project. If business process workflow 340 is not related to the project associated with folder 322, folder 322 may be displayed, but non-selectable, or perhaps not even displayed, because the context of application 310 does not provide any relation to the project, whether through work to be done, and/or permissions. In one embodiment, there are no actions to perform on the project, and folder 322 is inaccessible until a workflow task is provided to application 310 (i.e., the occurrence of an event or condition). Similarly, item 326 may be accessible within the context of application 310, and item 328 is unavailable under the same context. Besides dynamic display of action/task navigation items 322-328, content in work pane 330, business process workflow 340, and/or tools 350 can be dynamically affected by the context of application 310, as described in more detail below.

In addition to action pane 320, application 310 includes work pane 330, which provides an area in which to view and perform work done in application 310. Note that the layout of action pane 320 and work pane 330 is merely for purposes of illustration, and action pane 320 may be located with task bar 312, or anywhere else within application 310. Work pane 330 includes one or more objects 332-336, which can be objects related to a workflow, a process, or other data. Based on the context, object 332 may be available, while other objects 334-336 may be inaccessible and/or unviewable.

Selection of, or action on item 326 can provide a view of business process workflow 340. The view of workflow 340 can be within work pane 330, or alternatively, within a separate window or pane (as shown in FIG. 3). Thus, an appropriate view may be enabled in which enterprise-level access tools may be provided within the context of application 310. The view of workflow 340 may also include tools 350, with items 352-356 for actions specific to working on workflow 340. Items 352-356 provide functionality to tie a certain action or view or data access to the backend enterprise system. One embodiment of a view of workflow 340 includes providing a view of each phase of the workflow. In the embodiment shown, the view of workflow 340 provides a view of phase 342 of workflow 340. The view of phase 342 is due to the contextual awareness with which data is provided to application 310. For example, application 310 can provide a query or request for data to a backend enterprise system related to business process workflow 340 in response to a selection of item 326 corresponding to the workflow. The backend system can determine that the context of application 310 is workflow 340, for example, by the passing of a workflow ID by application 310 with the request for data.

In addition to the immediate contextual information that indicates application is working on workflow 340, the backend system may determine the contextual information that the current phase of workflow 342 that needs attention is phase 342. Thus, the view of workflow 340 presents phase 342, with action 344 and sub-action 346 that can be selected for performance. In one embodiment, phase 342 includes action 348 that may be inaccessible with the current context. For example, action 348 may be dependent upon an action or item of information to be discerned from performance of action 344. Thus, action 348 may be inaccessible until action 344 is complete. In response to completion of action 344, action 348 can be made accessible. Each action/sub-action can include one or more tools to perform the work of the action and one or more items of information related to the task.

Tools 350 may also be dynamically provided based on contextual awareness. For example, phase 342 of workflow 340 could be related to salary information. Tools 350 may include items 352 and 356 related to changing salary and/or bonus. If workflow 340 is displayed to the user about whom the information relates, the user may be able to see the salary and bonus information, but be restricted from changing it. If workflow 340 is displayed to a manager of the user about whom the information relates, the manager may be able to see and modify the salary and bonus information.

Note that any one of the dashed items may be selectively displayed and/or accessible, or any combination of dashed and non-dashed items of FIG. 3 can be selectively displayed and/or accessible. Thus, a particular tab in action pane 320, a particular object of work pane 330, a particular aspect of workflow 340, and/or a particular item of tools 350 can be selectively accessible alone, or in conjunction with any other of the same or different items.

Groupware application 310 is connected, perhaps through network 360, to groupware content manager 370. In one embodiment, one or more elements of groupware content manager 370 resides within groupware application 310 and/or a device executing application 310. Groupware content manager 370 includes one or more modules, which can be implemented in hardware and/or software, of which one or more modules can be implemented in whole or in part as a module provided by an article of manufacture.

Query process module 372 enables groupware content manager 370 to receive and process queries or requests for data. The query is generated from application 310, and may indicate one or more items of information that indicate a context (e.g., user ID, workflow ID, etc.). Query process module 372 can parse information in the query and determine what enterprise data is requested from the backend systems.

Context determiner module 374 enables groupware content manager 370 to determine a context of the query. The context of the query refers to a context of application 310 from which the query is originated. For example, a query may be generated in response to starting up application 310, and/or with respect to an attempt to access information related to a particular project, workflow, action, etc., which is available to a user from within application 310. Context determiner module 374 includes the ability to identify context from identifiers received by query process module 372, and/or to derive the context from work being performed, data recently accessed, a task recently accessed and/or completed, an item in a worklist or dynamic work center, etc. In one embodiment, context determiner identifies a role associated with a user with respect to a particular work item.

Permission identifier module 376 enables groupware content manager 370 to determine a permission associated with a particular context. The permission enables access to particular data and/or tools/functions/services that are potentially available for a particular view or a particular application, or a particular workflow, or a particular department, etc. Permission identifier module 376 includes or has access to one or more repositories of information, including a permission information repository and/or rules store associated with particular conditions (e.g., a particular role, a particular phase of a workflow, etc.). Permissions may be stored for particular scenarios or particular users, or permission identifier module 376 can derive the permissions based upon certain rules, lookup tables, etc., which apply generally to all conditions and are narrowed by particular context information provided. Permissions may refer to the services available to a particular groupware client. In one embodiment, the services available to the groupware client differs based on the context of the groupware client.

Data selector module 378 enables groupware content manager 370 to selectively choose data to provide to application 310. In one embodiment, data selector module 378 has access to all data requested, and then selectively accesses only data related to the query according to the permissions. In another embodiment, a data access enforcement module exists within a database of information, and data selector module 378 has only the ability to access the data that is provided by the permissions. Note that some data can be left un-accessed based on the permissions. Similarly, some data may be specifically accessed based on the permissions.

Transmitter 380 enables groupware content manager 370 to provide the selected data to application 310. Transmitter 380 includes one or more interfaces with which to couple to application 310 to provide the data selected.

Figure 4:
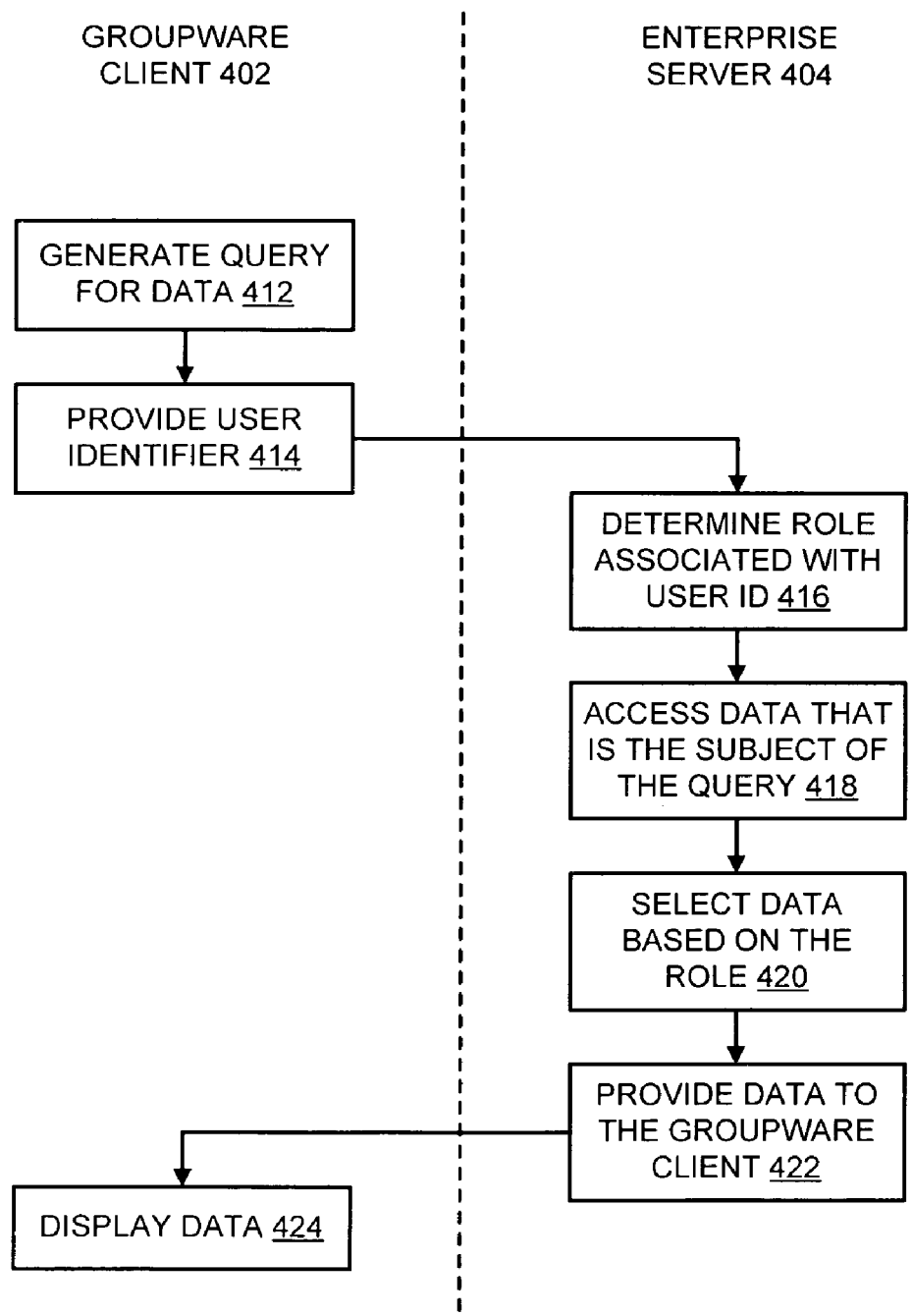
FIG. 4 is a flow diagram of an embodiment of selecting enterprise data to a groupware client based on a user role associated with the groupware client.

FIG. 4 is a flow diagram of an embodiment of selecting enterprise data to a groupware client based on a user role associated with the groupware client. FIG. 4 provides an overview of various operations that can be performed, as well as the actors that can perform them. Groupware client 402 represents a groupware client according to any implementation described herein. Groupware client 402 generates a query for data, 412. The query can be generated in response to receiving an action by a user. For example, the query can be generated in response to a user selecting a workflow (a generalized request), or in response to a user selecting the specific data (a specific request). The query can be generated as part of loading of groupware client 402. The query can be generated in response to receiving at groupware client a workflow task associated with a particular workflow or other data. The query can also be generated in relation to another event, upon another condition, etc.

In one embodiment, the request is aggregated with a user ID, 414. The user ID can indicate the specific user, and/or a role of the user. The user ID and the request are provided to enterprise server 404. Enterprise server 404 determines a role associated with the received user ID, 416. The role of the user may be derived from the user ID, where the backend application can maintain a repository of information or access information maintained by the enterprise that indicates roles associated with particular user IDs. The repository may also include information indicating permissions associated with or corresponding to the role. Roles may include positions within an organization (e.g., developer, manager, vice president), or a position on a project or a team (e.g., team leader).

Enterprise server 404 accesses data that is the subject of the query, 418. Data that is related to the query may include more data than can be accessed given the role and associated permissions. Thus, enterprise server 404 may select data based on the role, 420. Selection of the data may be performed based on a rules engine that enforces permissions for data access. The selected data is provided by enterprise server 404 to the groupware client, 422. Groupware client 402 can then display the selectively provided data in a user interface.

Figure 5:
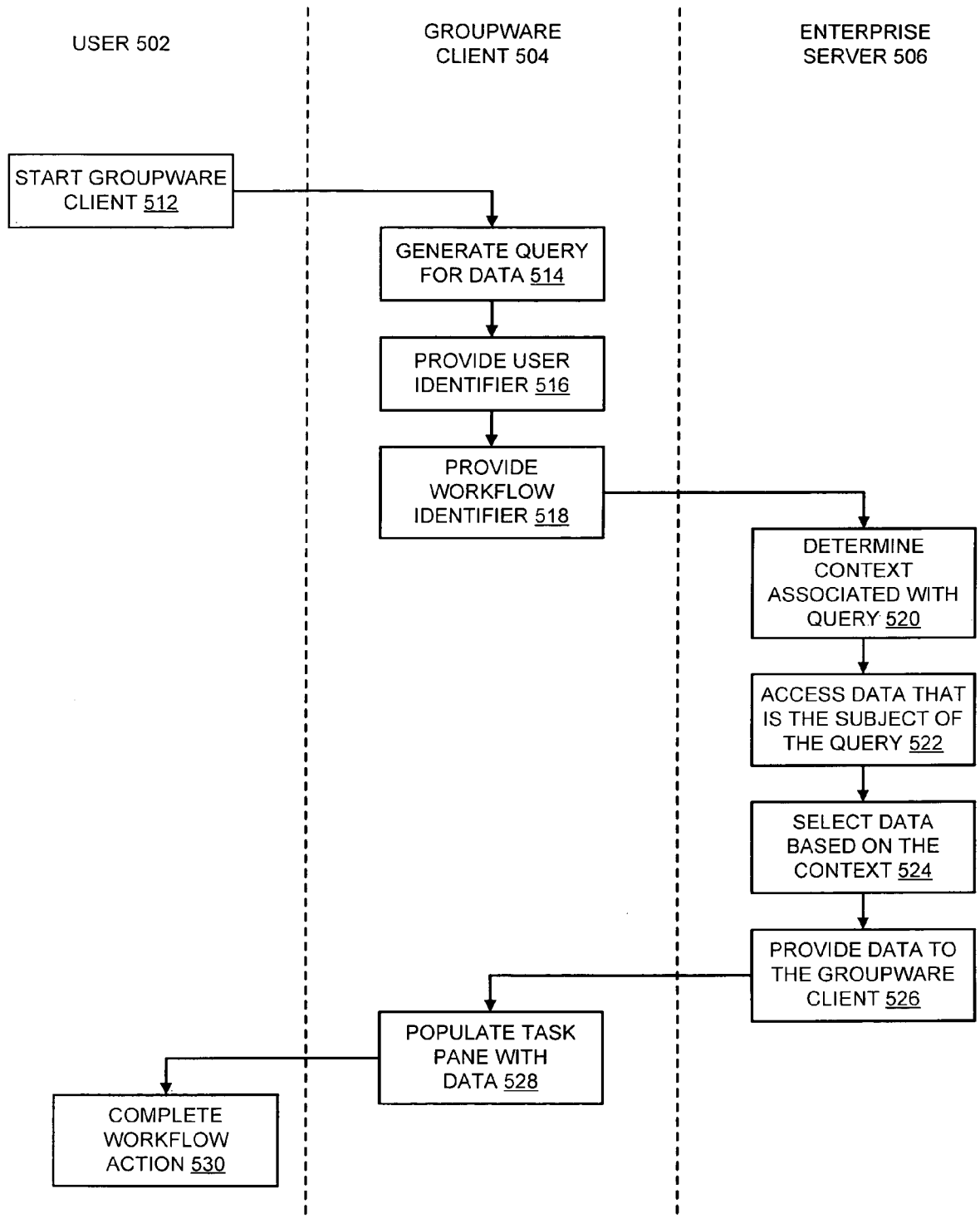
FIG. 5 is a flow diagram of an embodiment of selecting enterprise data to a groupware client based on a context associated with the groupware client.

FIG. 5 is a flow diagram of an embodiment of selecting enterprise data to a groupware client based on a context associated with the groupware client. User 502 starts a groupware client, 512. The groupware client may be started as part of loading an application that connects with a groupware server. In one embodiment, as part of the initiation of groupware client 504, the groupware client generates a query for data, 514. A query for data may also be generated in response to a selection of a particular tool, data view, workflow, etc., by user 502 within the context of groupware client 504. Thus, groupware client 504 can receive a command for a particular view or operation and generate a request for associated data in response to the command. Groupware client 504 generates the request for the backend enterprise server that includes the data and the mechanisms with which to operate on the data.

Groupware client 504 provides a user identifier to the backend, 516. The user identifier can be determined, for example, from an operating system on which groupware client 504 is executing. A user could also be requested to "login" for access to information or tools, which would provide the user identifier. The user identifier is not necessarily the same identifier used in the context of the operating system or a network connection, although it could be. In one embodiment, groupware client 504 can also determine a workflow identifier associated with the query. For example, the request may be related to a view on data associated with a particular workflow, either directly, or indirectly through a request related to an action of a workflow. Thus, an operation or command or a request for a view can be related to a workflow, which has a particular identifier. Groupware client 504 provides the workflow identifier to the enterprise server, 518.

In response to the request, enterprise server 506 determines the context associated with the query, 520. The context may be indicated directly from groupware client 504. Enterprise server 506 may also determine the context from information related to the workflow identifier, the user identifier, metadata associated with the request, etc. Enterprise server 506 accesses data that is the subject of the query, 522, and can selectively choose data to provide to groupware client 504 based in whole or in part on the context, 524. Enterprise server 506 provides the selected data to the groupware client, 526, which can then populate a task pane of a user interface of an application associated with the groupware client with data, 528. Based on the information and/or tools provided, user 502 can then complete the workflow action, 530.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for providing data to a groupware client application (GCA) of an office productivity suite of applications, comprising:

receiving at an enterprise server a query from the GCA for enterprise-level data, the query generated within a context of the GCA for the enterprise-level data, the context being a local working environment of the GCA, wherein the GCA being a collaborative application having an associated groupware server that provides services to collaborative applications, the GCA including native functionality to access the associated groupware server but not to access the enterprise server, wherein an extension to the GCA enables the GCA to interact directly with the enterprise server, bypassing the groupware server to access enterprise-level data while leaving unaffected access to other data by the GCA through the groupware server, and wherein the enterprise-level data is associated with execution of a workflow from within the context of the GCA;

determining at the enterprise server the context of the GCA in which the query was generated, including identifying a workflow associated with the query;

selecting enterprise data based at least in part on the determined context; and providing, in response to the query, the selected data within the context of the GCA through the extension to the GCA, including integrating the selected data into a user interface of the GCA to enable interaction with the selected data through the GCA via the extension that provides functionality in the GCA to interact with enterprise-level data associated with the workflow from the context of the GCA without having to change from the context of the GCA to another application to access the enterprise-level data.

2. The method of claim 1, wherein receiving the query from the GCA comprises: receiving the query from an email client.

3. The method of claim 1, wherein receiving the query for enterprise-level data comprises: receiving a query for a workflow object.

4. The method of claim 1, wherein identifying the workflow further comprises:

receiving a workflow identifier with the query;

determining a status of the workflow; and identifying data related to a current phase of the workflow.

5. The method of claim 1, wherein determining the context of the GCA comprises: identifying a permission associated with the query.

6. The method of claim 5, wherein identifying the permission associated with the query further comprises:
  receiving a user identifier with the query;
  and determining a permission associated with the user identifier.

7. The method of claim 5, wherein identifying the permission associated with the query further comprises:
  identifying a business role associated with the query; and
  determining a permission associated with the business role.

8. The method of claim 1, wherein selecting the enterprise data based on the determined context comprises:
  accessing enterprise data associated with the query;
  and selecting what data associated with the query is accessible with a permission associated with the determine context, and not selecting the data inaccessible with the permission.

9. The method of claim 1, wherein providing the selected data to the GCA comprises: populating a task pane of the GCA with the selected data.

10. The method of claim 1, wherein providing the selected data to the GCA comprises: providing the selected data to cause the GCA to display a business object as accessible if data is provided for the business object, and display the business object as inaccessible if data is not provided for the business object.

11. The method of claim 1, wherein determining the context of the GCA comprises: determining the context from one or more of a business role associated with the GCA, a user identifier, or a workflow identifier.

12. An article of manufacture comprising a computer readable storage medium having content stored thereon to provide instructions to cause a machine to perform operations in an enterprise data interface, the operations including:
  receiving a request for data from a groupware client application (GCA) of an office productivity suite of applications,
  wherein the request for the data is generated within a context of the GCA, the context being a local working environment of the GCA,
  wherein the GCA being a collaborative application having an associated groupware server that provides services to the collaborative applications, the GCA including native functionality to access the associated groupware server but not to access the enterprise server,
  wherein an extension to the GCA enables the GCA to interact directly with the enterprise server, bypassing the groupware server to access enterprise-level data while leaving unaffected access to other data by the GCA through the groupware server, and
  wherein the data is associated with execution of a workflow from within the context of the GCA, the workflow managed by a server other than the groupware server;
  determining a the context of the GCA, including identifying the workflow associated with the query;
  determining a permission of the GCA to access the requested data in response to determining the context; and
  selectively providing, in response to the query, some or all of the requested data within the context of the GCA through the extension to the GCA, including integrating the selected data into a user interface of the GCA, based at least in part on the permission of the GCA to access the requested data, to enable interaction with the data through the GCA via an the extension that provides functionality in the GCA to interact with data associated with the workflow from the context of the GCA without having to change from the context of the GCA to another application to access the enterprise-level data.

13. The article of manufacture of claim 12, wherein the content for receiving the request for data comprises content for receiving a request for a workflow object.

14. The article of manufacture of claim 12, wherein the content for selectively providing the requested data comprises content for providing a tool for the GCA to provide functionality to operate on data.

15. A system comprising:
  a backend enterprise system including one or more enterprise servers having data accessible via a service;
  a groupware client application (GCA) of an office productivity suite of applications having a context, the context indicated by an identifier and being a local working environment of the GCA, the GCA to generate a request from within the context for data from the backend enterprise system,
  wherein the GCA being a collaborative application having an associated groupware server that provides services to the collaborative applications, the GCA including native functionality to access the associated groupware server but not to access the enterprise server,
  wherein an extension to the GCA enables the GCA to interact directly with the enterprise server, bypassing the groupware server to access enterprise-level data while leaving unaffected access to other data by the GCA through the groupware server, and
  wherein the data is associated with execution of a workflow from within the context of the GCA, the workflow managed by a server other than the groupware server; and
  a content manager coupled to the backend enterprise system and to the GCA, the content manager to receive the request for data, identify the context of the GCA in response to receiving the request including identifying a the workflow associated with the query, and, in response to identifying the context,
  selectively provide, in response to the query, the data related to the request to the GCA within the context of the GCA through the extension to the GCA including integrating the selected data into a user interface of the GCA to enable interaction with the data through the GCA via an the extension that provides functionality in the GCA to interact with data associated with the workflow from the context of the GCA without having to change from the context of the GCA to another application to access the enterprise-level data.

16. The system of claim 15, wherein the content manager identifies the context of the GCA by identifying one or more of a business role, user identifier, or workflow identifier associated with the GCA.

17. The system of claim 15, the content manager further to identify a workflow indicated in the request, determine a current phase of the workflow, and provide data related to only the current phase of the workflow.

* * * * *